Aug. 30, 1932.　　W. H. WHEELER, JR., ET AL　　1,874,073
POSTAGE METER MACHINE
Filed March 8, 1929　　8 Sheets-Sheet 4

Patented Aug. 30, 1932

1,874,073

UNITED STATES PATENT OFFICE

WALTER H. WHEELER, JR., AND JACOB W. OGDEN, OF STAMFORD, CONNECTICUT, ASSIGNORS TO PITNEY-BOWES POSTAGE METER CO., OF STAMFORD, CONNECTICUT, A CORPORATION OF DELAWARE

POSTAGE METER MACHINE

Application filed March 8, 1929. Serial No. 345,515.

This invention is an improvement in so-called postage meter machines which imprint postage indicia on letters in lieu of stamps. The object of the present invention is to provide a machine whereby a large variety of amounts of postage can be printed upon envelopes or the like, passed through the machines; the machine being provided with a plurality of dies each adapted to print postage stamps of a different denomination as desired directly upon mail matter and with means whereby if desired the same stamp can be repeatedly printed upon the same envelope as it passes through the machine.

In the following description and claims the word envelope is to be understood as including any kind of mail matter or objects which may be passed through such a machine to have stamps imprinted thereon. Further the machine is adapted to postmark and print one or more stamps one or more times upon the same envelope and to seal the envelope if desired all during one passage of the envelope through the machine. Furthermore the machine will record the value of each stamp, of whatever denomination, that is printed upon the envelope and whether the same stamp be printed one or more times upon the same envelope during one passage thereof through the machine the full value of each stamp impression on the envelope will be recorded in the register. The machine furthermore is provided with means whereby the value of the stamps printed are recorded in a postage meter contained in a part of the machine which can be removed therefrom, so that the meter can be taken to the post-office and set for different amounts of prepaid postage and when such amount of prepaid postage has been used the machine will become automatically locked against further operation until additional postage is purchased.

In particular the machine embodies novel means for stopping the envelope while it is passing between a printing drum and continuously revolving impression roller. Novel means for selecting and locking the stamping dies in the proper printing position and preserving the relation between each of the dies and its selective gear connection with the counting mechanism of the postage meter. Novel means for stopping the counting mechanism at the proper instant insuring an exact count; and novel means to prevent fraudulent imprints from being made from the printing dies.

In the accompanying drawings forming part of this specification we have illustrated one practical machine embodying the invention, and an explanation and understanding thereof will enable others to adapt and use the same; in the claims we have summarized the essential features of the invention and the novel features of construction and novel combinations of parts for which protection is desired.

In said drawings.

The machine illustrated is composed of two separable units one a base unit which can be stationary or fixed in position and the other unit is movable, being mounted upon the base unit—but detachable from and replaceable thereon and easily portable.

The base unit A (Figs. 1, 7, 8 and 9) contains the sealing mechanism and impression roller, and can be mounted on any suitable support and is intended to be a fixture in the user's office. The portable unit B contains the printing dies and postage meter registers and is readily attachable to and detachable from the unit A, and so light it can be easily carried to the postoffice for the purpose of having the meter "charged" with an amount of prepaid postage. When unit B is attached to unit A the two are coupled together by a self contained locking mechanism which renders the machine as a whole operative, but prevents operation thereof or of the printing mechanism or register when the units are separated.

The base unit A

The base unit A (Figs. 2, 7–9) is composed of a hollow base 100 provided with two studs 100a, and a clamp screw 100b mounted in projections on its upper surface, for the purpose of clamping the portable unit securely to it. It is also provided with a key 100c (hereinafter explained) which enters a hole in the bottom of 1a of the portable unit and coacts with other means to release the locks which have prevented the operation of the mechanism when the portable unit is separated from the base unit.

Figure 8:
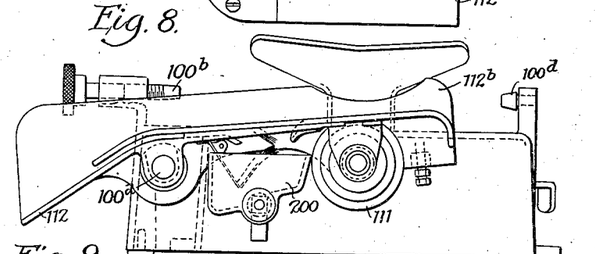
Fig. 8 is a front view of Fig. 7.
Figure 9:
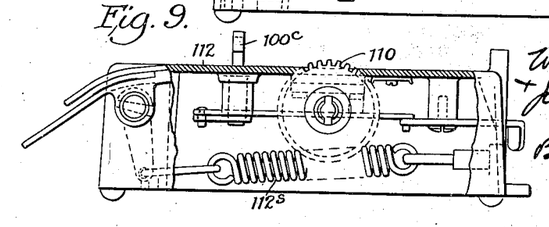
Fig. 9 is a detail sectional view on line 9—9 of Fig. 7.

Pivoted on the front wall of the base 100 is a rocking frame 112 containing a rubber faced roller 111 Fig. 8 and a moistening device indicated at 200 for the flaps of the envelope. The frame 112 is rocked upwardly by a spring 112s Fig. 9, its upward movement being limited by any suitable means. Said frame 112 being yieldable to pressure in a downward direction. The roller 111 Fig. 8 is revolved by means of a flexible coupling 110b Fig. 7 connecting it with a jack shaft 100d within the base 100. Shaft 100d is driven through the gears 110 and 9 (Figs. 3 and 7), by the printing drum shaft 6. The gear 110 projecting sufficiently above the base 100 to enable it to enter a hole in the bottom 1a of unit B and engage with the gear 9 secured to shaft 6. The roller 111 lies directly under the printing drum 16 when the base and portable units are assembled so that a piece of mail passing between them will receive an imprint from the dies on the drum by reason of the spring pressure urging the roller upward against the dies.

The portable unit B

The casing of the portable unit B (Figs. 1, 2, 3) is formed in two parts, one includes the bottom wall or floor 1a, a side wall 1b and a front wall 1c which may be either in one piece or securely united to act as one integral part. The other part includes the top, back and the other side wall which are preferably formed in one piece. This part is slidable in grooves formed in the bottom 1a and side 1b until it abuts against the front wall 1c. A bolt 19 is passed through a hole 3a in the cover 3 and secured to the bottom 1a by a screw indicated at 19a in Fig. 2 passing up from the bottom into the stud. The head of the screw is then suitably sealed to prevent its being removed. The entire mechanism in the unit B is thus completely enclosed and sealed against unauthorized manipulation.

Figure 1:
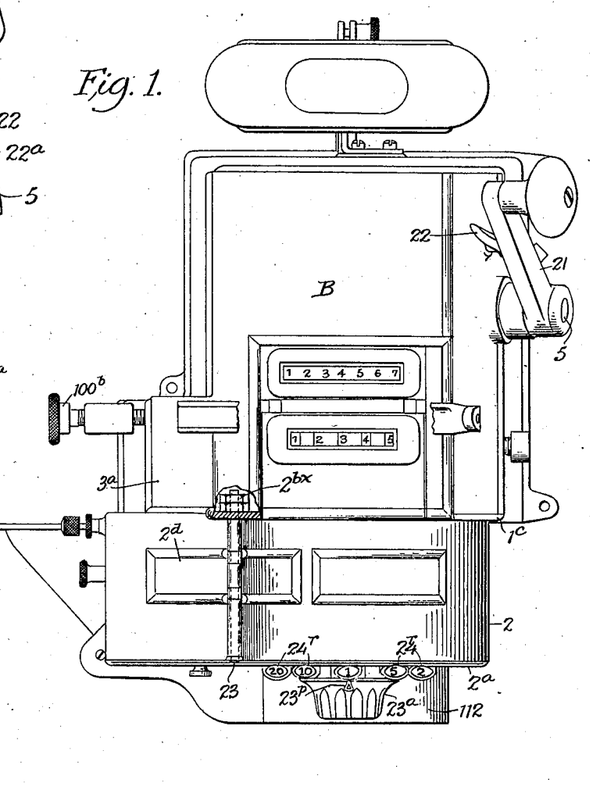
Fig. 1 is a top plan view of the complete machine.
Figure 5:
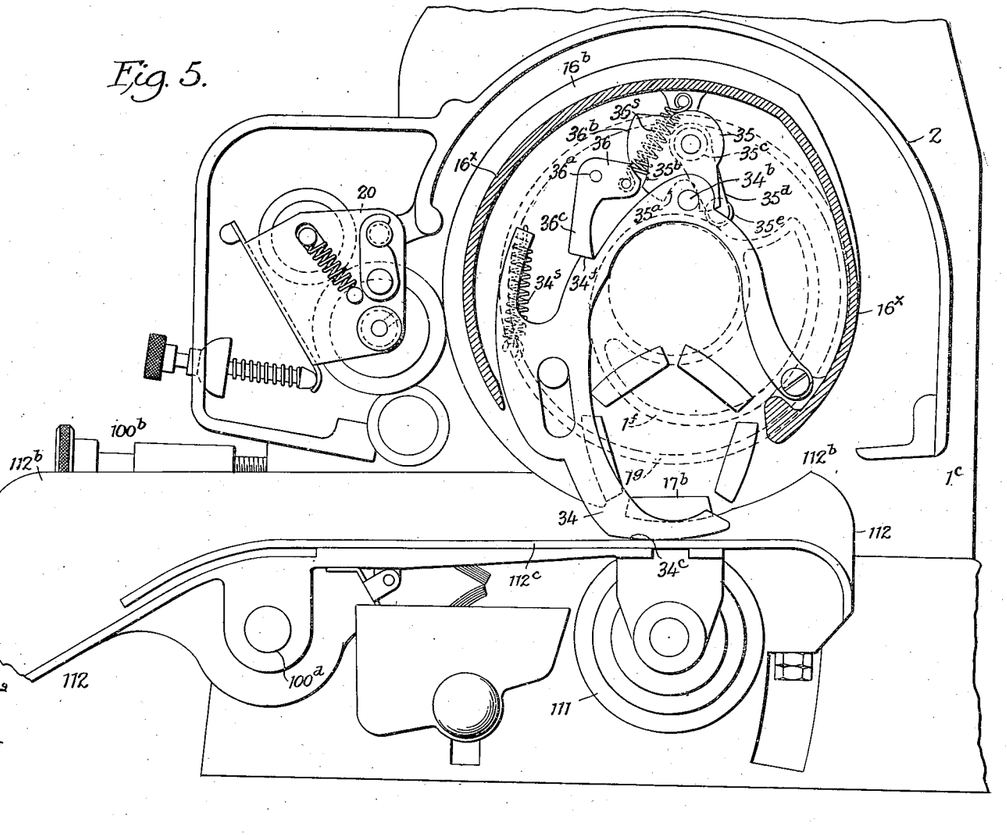
Figs. 5 and 5a are enlarged views showing the die guard and related devices, the printing drum being shown in dotted lines.

On the front wall 1c of the unit B is a housing 2 (Figs. 2 and 3) within which is a revoluble drum 16 upon the cylindrical face of which are mounted the printing dies. This drum 16 is adjustably mounted upon an actuating shaft 6 as hereinafter explained. The front of the housing 2 (Fig. 2) containing the printing drum 16 is closed by a plate 2a secured by several screws and by a bolt 2b which passes entirely through the front wall 1c and within the sealed casing where it is secured by nuts 2bx as indicated in Fig. 1. This prevents access to the printing dies as the cover 2a cannot be removed. Adjacent to the printing drum and within the housing 2, Fig. 5, the inking devices are mounted. Access may be had to the inking devices through a door 2c, Fig. 2, through which they may be removed and replaced or the ink rollers may be re-inked through a top door 2d, Fig. 2, without removing them.

Figure 3:
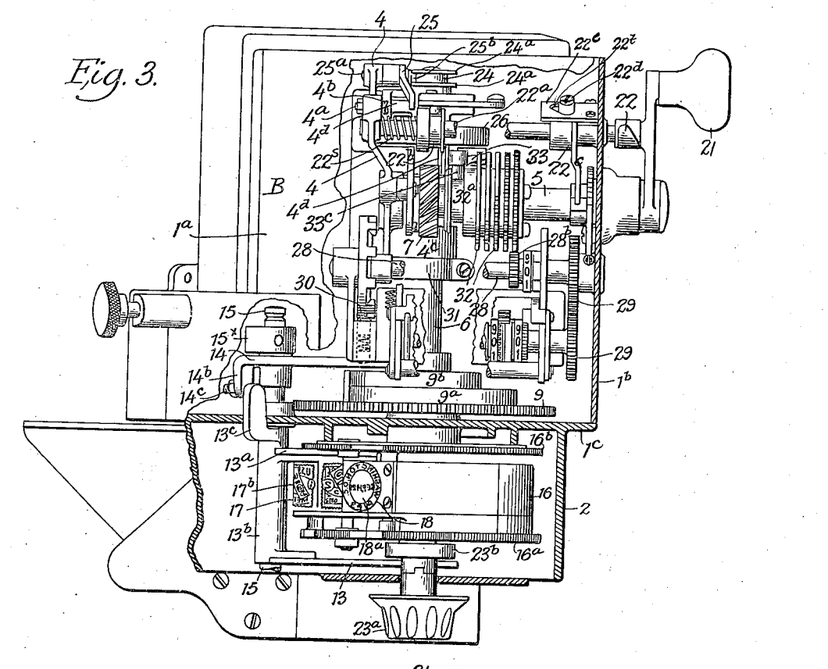
Fig. 3 is a top plan view of the machine with the casing broken away to show the interior mechanism.
Figure 4:
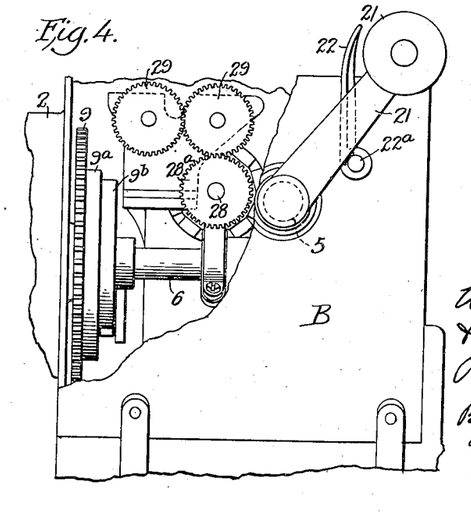
Fig. 4 is a detail side view, with the casing broken away, showing the gear connection with the counting mechanism of the meter.
Figure 11:
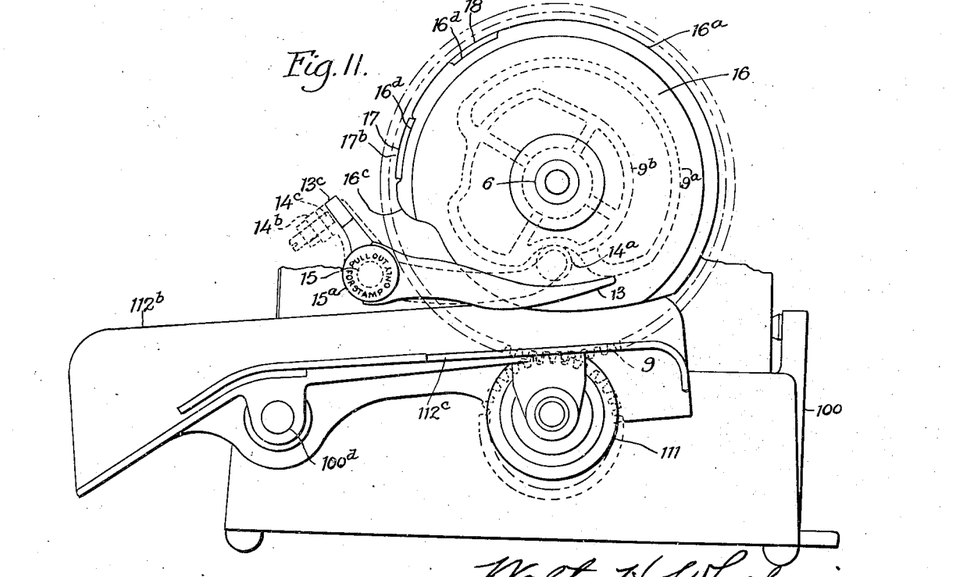
Fig. 11 is a front view of parts shown in Fig. 10.

The printing drum 16 Fig. 11 is approximately cylindrical in shape and has rigidly secured to its convex surface a post marking die 18, Figs. 3 and 11, engraved with the name of the post office and provided with adjustable date printing wheels 18a. Adjacent to the postmarking die is mounted a revolvable turret 17 Figs. 3 and 13 upon the face of which are fixed a number of dies 17b (five being shown) engraved to print as many different denominations of postage stamps. The turret may be revolved in order to bring any one of its several dies to the printing surface by a method of selection which will be explained later on. The location of the turret is such that one of its stamp dies 17b will be brought to the printing point opposite the impression roller 111 just in advance of the postmark die 18, when the printing drum is turned in a counter-clockwise direction.

Figure 10:
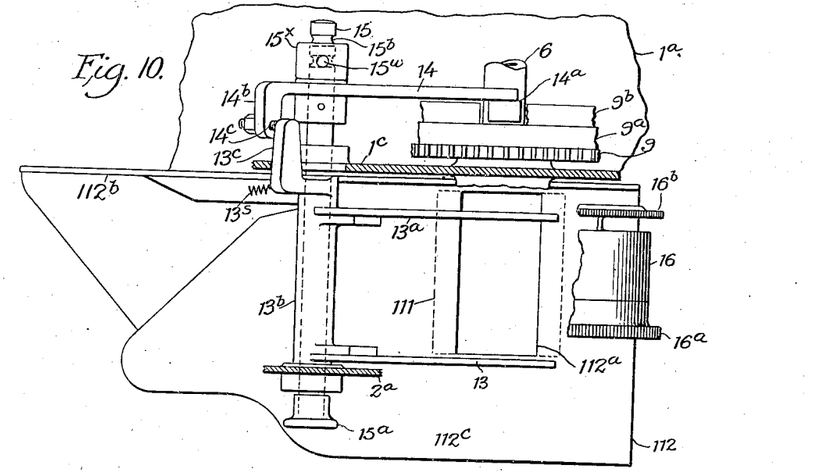
Fig. 10 is a detail view of the depressor fingers and related devices.

To the drum 16, Fig. 10, are fastened a front disk 16a and a rear disk 16b. The radius of the circular portions of both disks is identical with the radius of the printing surface of both stamp and postmark dies. The peripheries of such portions are knurled in order to enable them to feed the envelope. At points 16d, Fig. 11, the knurled surfaces of the disks are cut away so that all the pressure of the roller 111 may be applied to the dies to insure good printing. Both drum and disks are cut away at what is the bottom side when the drum is in normal position at the finish of each revolution (see Fig. 11) so that there will be a clear space between drum 16 and roller 111 for the introduction of the envelope to be operated on. And the points where the disks first make contact with the envelope, the ends are rounded off, (as at 16c, Fig. 11) the knurl following the rounded portion. This ensures a better grip on the envelope with less danger of marring its surface, as sharp corners would do.

Parallel to and a few inches removed from the side wall 1b (Fig. 3) is a bracket 4 which is secured to the bottom 1a, and also to the wall 1b by a tie rod 4a. This bracket is pierced with holes for the various shafts (see Figs. 12, 15 and 16) and with the side 1b and front 1c forms the framework of the machine.

Figure 2:
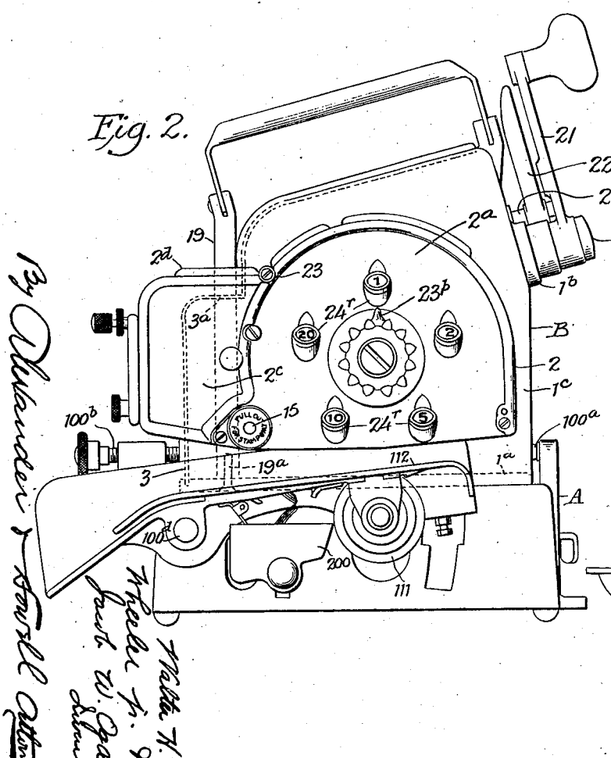
Fig. 2 is a front view thereof.
Figures 12, 13, 14:
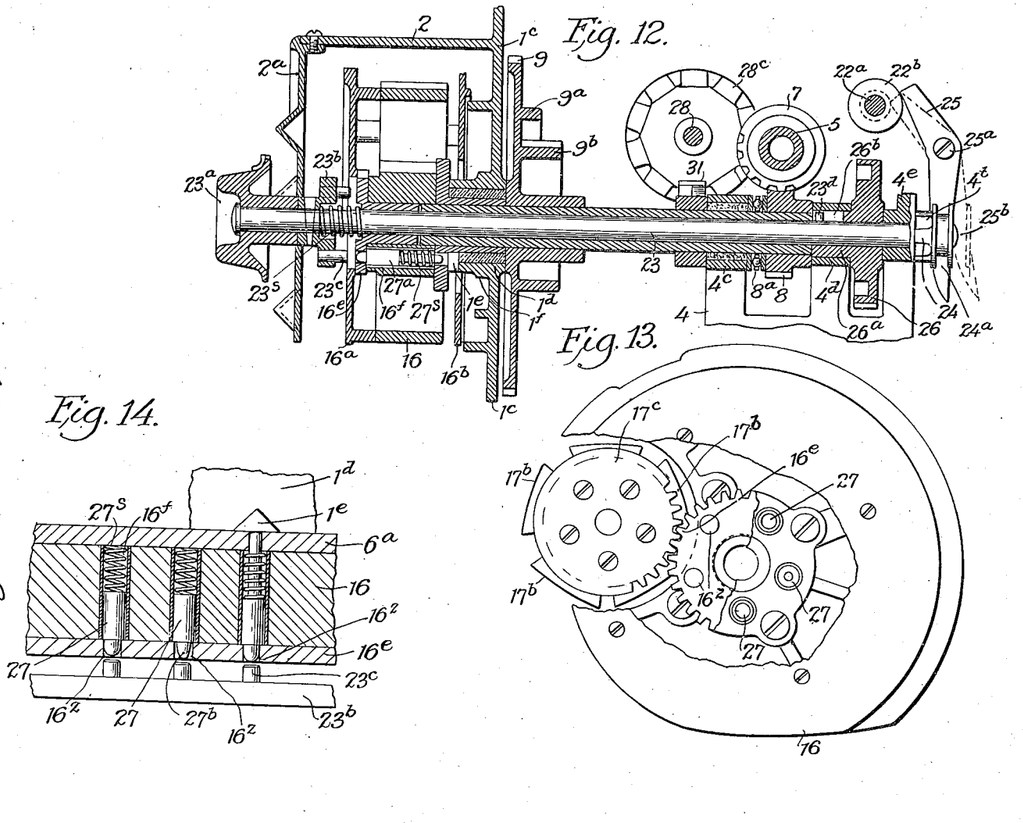
Fig. 12 is an enlarged detail sectional view of the selector mechanism.
Fig. 13 is a detail front view of the drum with the front disk broken away showing the turret and selector gears.
Fig. 14 is a detail section showing the tumbler pins.

The shaft 6 (Fig. 3) to which the printing drum is attached is operated through two spiral gears 7 and 8, Figs. 2 and 12, by a drive shaft 5, which lies a short distance above, and at right angles to it, and can be revolved by any suitable means, a hand crank 21 being shown, Figs. 1 to 4.

Parallel to and a short distance above and behind shaft 5 is a shaft 22a (Figs. 3, 4 and 12) which passes through the wall 1b and normally projects a sufficient distance to interfere with the turning of the hand operated crank 21, and thus acts as a stop to terminate the cycle of operation.

Near the inner end of shaft 22a a flanged collar 22b is secured, and between it, and the bracket 4 is placed a coiled spring 22s which tends to push the shaft 22a outward through the wall 1b, its outward movement being limited by a stop collar 22c on the shaft inside the wall 1b. A pin 22d in collar 22c engages an angularly disposed cam slot in a curved plate 22e fastened to the inner side of wall 1b.

Secured to the outer end of shaft 22a is a lever 22 so disposed that it may be conveniently moved by the thumb of the hand operating the crank 21 to turn shaft 22a. When shaft 22a starts to revolve the pin 22d of collar 22c engaging the cam slot 22e causes the shaft to move inwardly as it turns and this withdraws shaft 22a out of the path of crank 21 which can then be turned. When the thumb releases lever 22, the shaft 22a is moved outward by spring 22s and restored to position to stop the crank 21 at the end of a revolution.

*Operation*

In operating the aforesaid parts an envelope is slid flap downward from left to right over the frame 112 until its leading end is slightly to the right of a line connecting the centers of roller 111 and drum 16 (Figs. 2 and 11) and allowed to lie there. Then lever 22 is pressed with the thumb and moves shaft 22a out of the way of the crank 21 which is turned one revolution or until it comes to a stop against the end of shaft 22a which is released when crank 21 has passed shaft 22a in its initial movement. This causes the printing drum 16 to revolve once, and the dies will be inked in passing by the inker 20. Shortly before the dies arrive at the printing point the envelope will be gripped between the drum and revolving roller and, if but one stamp is to be printed thereon, will be forwarded through and delivered onto the table or any suitable receiver at the right of the machine, Fig. 2. In such passage the flap of the envelope will have been moistened by the moistener 200, and the dies will have made an imprint on the face of the envelope, and the pressure on the envelope in passing between the drum and roller 111 will have caused the moistened flap to adhere to the envelope.

It is a requirement of the machine that the printing drum be revolved once for every stamp printed in order to register its value in the meter and to bring the dies into contact with the inker to prepare them for printing. If the postage required is more than the amount of any one die, it is necessary to make two or more stamp impressions on the envelope to place the proper amount of postage thereon. In order to print more than one stamp on an envelope it is necessary to stop the advance of the envelope immediately after the first imprint has been made thereon, and hold it in such position while the printing drum completes its revolution, and while the drum is again revolved and the stamp die 17 again arrives at the printing point; then the envelope must be released and advanced sufficiently to take the second impression; and if a third stamp impression is to be made on the envelope it must be arrested after the second impression while the drum is again revolved until it is advanced to receive the third impression; and so on till the required number of stamps are printed thereon, after which the envelope may be passed on through without more delay. When two or more stamp impressions are to be thus made on an envelope it is also necessary to "stop out" or prevent the postmarking die 18 (which bears the place of mailing and the date) from printing on the envelope after any stamp impression except the last one printed; as this postmark should appear but once on the envelope.

To accomplish this intermittent feeding stopping and starting of the letter and the stopping out of the postmarking die 18 two depressible cam-actuated fingers 13 and 13a (Figs. 10 and 11) are provided, and at the proper times these fingers are caused to press down upon the envelope with sufficient force to not only stop the advance of the letter but also depress the frame 112 and roller 111, and the envelope sufficiently to prevent contact of the postmarking die with the envelope,—(the postmarking die 18 follows the stamp die 17, see Fig. 11),—thus preventing the postmarking die printing until after the last required stamp imprint has been made on the envelope. Heretofore in machines of this character in order to avoid a conflict of the forces operating on the envelope an idler impression roller was used. But an idler impression roller is disadvantageous because the bottom side of the envelope has a tendency to lag due to friction and lack of any driving force thereon and the drag due to the sealer. This drag and lagging is especially noticeable on thick spongy letters and it is further objectionable because it is liable to cause a smeared or blurred imprint, and legibility of stamps is absolutely required. To overcome this objection in the present invention the impression is positively driven and the holding fingers, before mentioned, coact with such positively driven impression roller.

The frame 112 (Figs. 7, 10 and 11) carrying the pressure roller 111 has a plane surfaced top plate 112c with an opening 112a over the roller 111 and the top of the roller lies slightly below the top of plate 112c so that a card or envelope lying on that surface will just miss contact with the roller. The rear frame 112 has a rear vertical guide flange 112b, extending its whole length, and said flange acts as a limit stop and guide for positioning the envelopes on the frame.

The disks 16a and 16b on the drum would press against the roller 111 if no envelope were between them, and as both said disks and the roller are positively driven they will positively feed the envelopes through the machine.

The depressor fingers 13 and 13a Figs. 10 and 11 are fastened to a rocking frame 13b pivoted on a shaft 15 situated to the left of drum 16 and near the bottom of the housing 2. This frame is free to turn on shaft 15 but is prevented from moving axially thereon by the front wall 1c of the casing and the cover plate 2a (Fig. 10). Frame 13b has a rearwardly projecting lug 13c which passes through an opening in wall 1c and is engaged by a lug 14b on a lever 14 pivoted on shaft 15a. A spring 13s between lug 13c and the bottom of the housing 2 holds the lug 13c in contact with the lug 14b at all times.

The shaft 15, Figs. 10 and 11, upon which the fingers are pivoted, has an outer bearing in the cover plate 2a and an inner bearing in a boss 15x on the floor 1a of the casing. To this shaft within the casing is secured an arm 14 one end of which is provided with a roller 14a to engage with either of the two cams 9a or 9b on gear 9. An axial movement of shaft 15 controlled by the external manually operated knob 15a Figs. 10–11 allows the cam arm 14 to engage either of the cams 9a or 9b at the will of the operator. Two grooves 5b at the end of the shaft and engaged by a spring ball 15w in the inner bearing 15x hold it in either of the positions to which it has been adjusted. The cam arm 14, Fig. 10 is provided with a forwardly projecting lug 14b in which is placed an adjusting screw 14c that engages the lug 13c of the frame carrying the fingers 13 and 13a. The gear 9 with its cams is fastened to the drum shaft 6 so that the motion of the depressor fingers, controlled by the cams, will always be in unison with the movement of the printing drum.

The rear finger 13a lies in a space provided for it between the rear disk 16b and printing drum 16 and the forward finger 13 lies in the space between the front disk 16a and the cover plate 2a. The location of the roller 111 and the opening 112a in frame 112 is such that when the front finger 13 is depressed it will, if no envelope intervenes, press against the plane surface of the frame, close to but clearing the moving roller 111. It will be seen that an envelope pinched between the finger and the plane will not be acted upon by the revolving roller because as was stated before the surface of the roller lies slightly below the plane. The rear finger 13a would if its descent were continued press upon the roller; but it has been made with its lower surface slightly further from the plane than finger 13 so that it does not press the envelope against the roller. Its only function is to hold down clear of the printing dies, the surface of the envelope which being distorted by the pressure of finger 13, tends to bulge up and touch them.

When it is desired to print a number of stamps (take three for example) the knob 15a is pulled out, shifting cam arm 14 to cam 9a. The machine is then operated and when the drum begins to turn the fingers descend and hold the letter firmly until the instant that the rounded portions 16c of the disks strike the envelope; then immediately rise until the stamp is printed, when they again descend before the post marking die 18 arrives, and depress the envelope and frame 112 and the impression roller sufficiently to allow the die and disks to pass without touching the letter. The fingers retain this position until the drum has almost completed one revolution, then they rise to their normal height, the envelope remaining in the position where the fingers left it. The operation is then repeated by again rotating the drum and the second stamp is printed on the envelope which has been advanced only the space required for two successive stamp imprints. The knob 15a is then pushed in bringing the cam arm 14 under cam 9b and the drum again revolved. The fingers, as before, immediately descend and hold the envelope until the disks come into action, then they rise to allow the stamp die to print, but this time, under control of cam 9b, they remain in their elevated position thus allowing the postmarking die to print on the envelope and the disks in cooperation with the impression roller to complete the feeding of the envelope through the machine. Such envelope has three consecutive stamp impressions followed by a postmark impression on its face, and it requires three turns of the handle or three revolutions of the drum to then stamp it. In a similar manner any other desired number of stamps may be printed on the envelope taking care however to push in the knob 15a before printing the last stamp, so that the postmark imprint will follow such stamp.

*The selective devices*

The mechanism for selecting the stamp dies to be printed and the means for locking the turret containing them in position after the selection has been made is as follows:

On the outer end of shaft 6 (Fig. 12) within the housing 2, is a flange 6a, to which the printing drum 16 is adjustably attached. Shaft 6 has one bearing in the front side 1c of the casing, and another in a member 4c of the bracket 4. On the rear end of shaft 6 is a spiral gear 8, a thrust bearing 8a being interposed between said gear and member 4c. Shaft 6 is tubular and through it extends a rod 23, the front end of which projects through the drum, and through an opening in the cover plate 2a of the drum housing, and is furnished with a knob 23a for hand operation. The rear end of rod 23 is supported in a member 4e of bracket 4 and on the extreme rear end of rod 23 a castellated collar 24 is secured which engages an opposed castellated flange 4t on member 4e. A revolvable face cam 26 is interposed between gear 8 and member 4e—said cam is bored for the passage of rod 23 and has a sleeve hub 26a mounted in a member 4d of bracket 4. The member 4e is preferably made detachable from the bracket 4, for convenience in assembling.

The turret 17, Fig. 13 is provided with a toothed gear wheel 17c by means of which it may be revolved and which is meshed with another and similar gear wheel 16e loosely mounted at the center of the printing drum 16. Gear 16e is kept concentric with the drum by its hub which is revolvable in the central hole of the drum. Five holes 16z (one for each die in the turret 17) are drilled through gear 16e equally spaced in a circle. Fastened to the shaft 23 and directly in line with gear 16e, Fig. 12 is a disk 23b which is provided with five pins 23c. These pins are placed in an equally divided circle matching the holes in the gear 16e which they are designed to enter. A spring 23s surrounding shaft 23 and placed between the gear 16e and disk 23b keeps them normally separated and also forces the shaft 23 to remain in its outer position with the castellations on stop collar 24a and support 4e in mesh.

In the body of the drum 16 (Figs. 12 and 13) and in alignment with the holes in the gear 16e are holes 16f in which are tumbler pins 27. These pins are normally projected by springs 27s, shoulders on the pins limiting their projection to a point where their extreme outer ends will be flush with the outer surface of gear 16e (see Figs 12 and 14). The pins 27 will hold the gear 16e fast to the drum 16, and as gear 16e and 17c of the turret are in mesh, the turret will also be locked thereto; and although the drum with its turret may be revolved as a whole their relative positions will not be altered. Their relative positions can only be altered by moving the gear 16e relatively to the drum.

When the drum is at rest at the end of a revolution the holes in gear 16e will be in alignment with the pins 23c of disk 23b and if the knob 23a is pushed in, the shaft 23 disk 23b and stop collar 24 will move inward, relieving the collar 24 from engagement with the support 4e; and the pins 23c will enter the holes in gear 16e and displace the tumbler pins 27; and as all five holes in the gear are filled by the pins 23c, the rod 23 with all on it may then be revolved. The gear 16e being then coupled to the shaft will revolve the turret and any other of its stamping dies can be brought into printing position. When the desired selection has been made, pressure on the knob 23a is released and the spring 23s will return rod 23 to its normal position, and the pins 23c will be withdrawn from gear 16e uncoupling gear 16e from the shaft, and pins 27 will reengage the gear and lock it to the drum and lock the turret in the position to which it was adjusted relative to the drum and stop collar 24 reengaging the projections on support 43 will prevent further turning of the shaft 23. The knob 23a (Fig. 1) has a pointer 23p which in conjunction with a series of spaced index figures 24r placed on the face of the cover plate 2a Fig. 2 enables the operator to tell at a glance which one of the dies of the turret is in the printing position.

The spacing of the pieces on the rod 23 Fig. 12 is such that the stop collar 24 will not be disengaged until the coupling of the gear 16e to the shaft is completed, and this makes it impossible to turn the knob 23a without also turning the turret. The relation between the two is thus preserved. The lands and spaces of the castellated stop collar and flange are such that engagement of the two can only take place at five points in the circle corresponding to the five points where the holes in gear 16e will register with the tumbler pins 27. The number of castellations in flange 4t and in collar 24 are equal to the number of stamp dies in the turret 17 (in this case five), and the rod 23 may be located in any one of five angular positions by first pushing the knob 23a inward to disengage collar 24 from flange 4t—then turning it to the division desired, and then allowing the collar to re-engage the flange.

If all of the tumbler pins 27 were alike, the turret might be revolved at any one of the five points in which the coupler pins 23c register with the holes in the gear, which might prevent the correct functioning of the machine. To prevent any such incorrect functioning one of the pins 27 (Fig. 14) is provided with a shank 27a long enough to project through the drum and flange 6a (see Fig. 14) so that its end is flush with the rear side of the flange. A notch 1e is cut in the boss 1d which forms a bearing for shaft 6, and the tumbler pin 27a can only be engaged by one of the coupling pins 23c at a time when it is in line with the notch 1e which will only be at the end of a full revolution of the drum.

Again if all pins 27 had a close fit in the holes of the gear 16e it would be possible by exerting pressure with the finger on the turret itself, to take advantage of what little slack or wear there might be in the castellations, pins and holes, and advance the gear to a point where the holes would not exactly line with the tumblers, and then on withdrawing the coupling pins the gear and turret could be advanced to the next division by pressure of the finger while the coupler was still disengaged. This might enable a fraudulent use to be made of the machine. To prevent this one of the tumblers 27 (Fig. 14) has its end 27b tapered so it is smaller on the end than the hole 16z and no misalignment of the holes that might be caused by loose fits could prevent the reduced end 27b from entering a hole 16z to an extent that would effectually prevent advancing of the turret by any other means than those provided for the purpose.

As the selection of dies can be made only at a time when the drum is in its normal position of rest, it is desirable to prevent accidental operation of the handle 21 at the time the selection is being made. This is accomplished by preventing the release of the hand operated crank 21. The action of shaft 22a Fig. 12, which acts as a stop for the crank 21 has been previously explained. This shaft 22a is prevented from moving inward during the die selecting operation by means of a lever 25 which is pivoted at 25a to a member of the bracket 4. One arm of lever 25 is provided with a pin 25b which engages a groove 24a in the stop collar 24 and the upper arm of lever 25 is adapted to engage a collar 22b on shaft 22. When the rod 23 is pushed inward preparatory to selecting a stamp die the stop collar 24 rocks the lever 25 and causes its upper arm to move into the path of collar 22b and thus effectually prevent inward movement of shaft 22a and the release of the hand crank 21 until rod 23 is again moved outward.

The meter

The counting mechanism or meter which registers the value of every stamp printed is similar to that in the meter described in Pitney Reissue Patent No. 15,734, of December 8, 1923, and therefore needs no detailed description or illustration herein. It is operated through a gear 28a Fig. 4 on shaft 28 which meshes directly with gears 29 on the numeral wheel spindles.

Figures 15, 16:
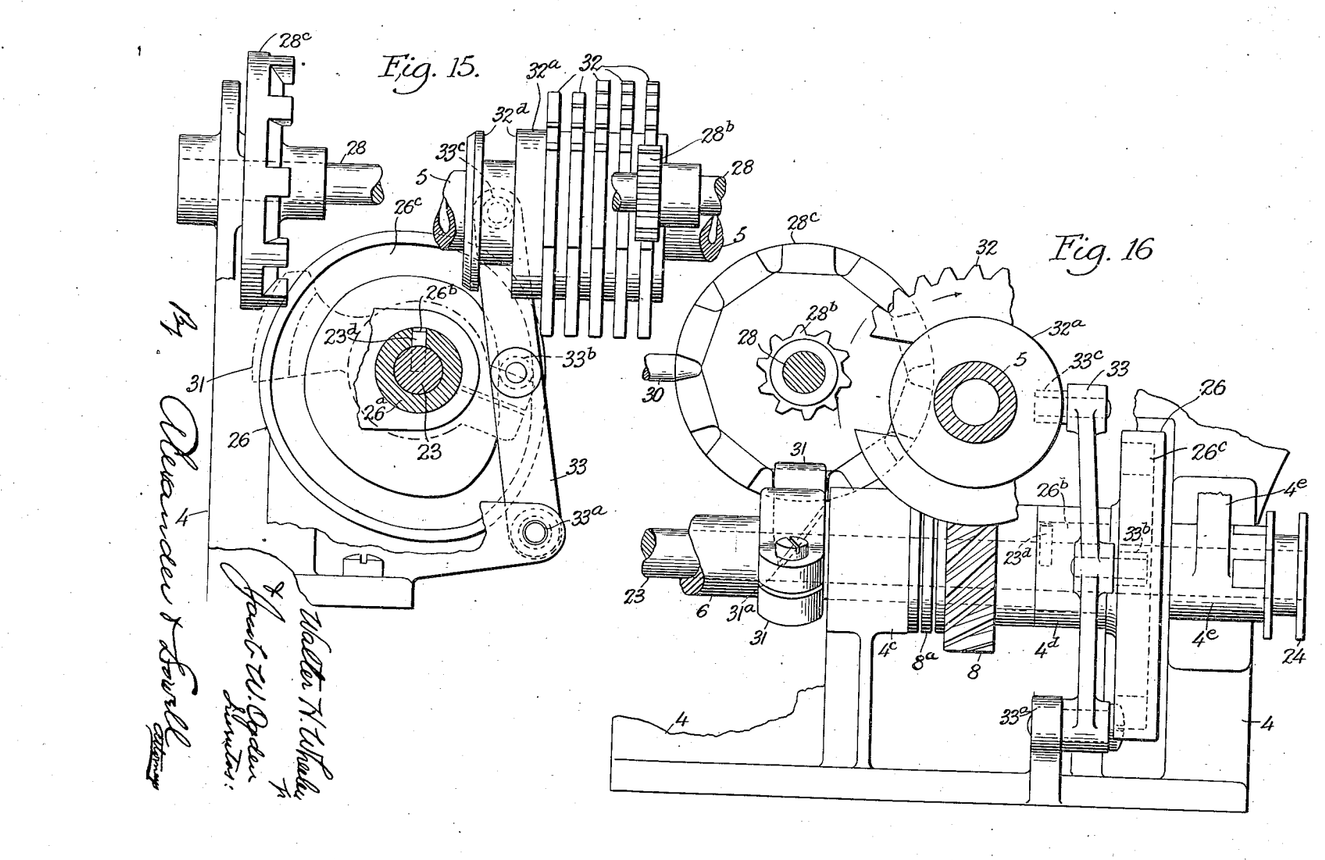
Fig. 15 is an enlarged detail view of the means for shifting the gear segments, crown wheel, and alignment arm.
Fig. 16 is a front view of Fig. 15.

The shaft 28 is driven intermittently by the pinion 28b which may be meshed with any one of five (one for each stamp) mutilated gear segments 32 which are mounted on a slidable carrier 32a keyed to the main shaft 5 (Figs. 15 and 16). Pinion 28b has ten teeth and one complete revolution of the shaft 28 will cause the counting mechanism to register ten units. Consequently if the pinion 28b be advanced one tooth the counters will register one; if advanced two teeth it will register two, etc. The gear segments 32 are therefore mutilated so that each has but one tooth for each unit of the denomination of stamps printed by its related die.

The carrier 32a is shifted to bring the proper gear segment into mesh with the pinion 28b by means of a cam 26 and a lever 33 (Figs. 15 and 16). Cam 26 is arranged between the members 4d and 4e on bracket 4 and has a hub 26a by which it is supported in member 4d and the rod 23 passes through the axis of the cam and a pin 23d on the rod 23 engages an elongated slot 26b in the hub 26a. This allows free movement of the rod axially of the cam but causes the cam to turn with the rod. A lever 33 is pivoted at 33a to a stud on the bracket 4 and is provided with an antifriction roller 33b on its lower end which engages the slot in the face of cam 26, while a roller 33c on its upper end engages a groove 32d in the hub of carrier 32a.

The cam slot 26c has a progressive series of "dwells", five in number, each a unit of distance farther from the center, all equally spaced angularly, and all connected by leads or spiral inclines; so that when the cam is revolved its effect on the lever 33 will be to move its upper end to five equi-distant positions and back to the first again; and the upper roller 33c engaging the groove 32d in the carrier 32a will cause the carrier and the segmental gears 32 to be so moved that each will in turn occupy a position in which its teeth would mesh with pinion 28b to operate the counting mechanism.

It has been above explained how the relationship between the turret dies and the angular position of the shaft 23 is preserved; and as cam 26 whose position governs the positions of the gear segments 32 is in turn governed by the position of shaft 23, it follows that the relation of the turret dies and the gears operating the counter will also be preserved. In other words, the whole mechanism of the selection of dies from the index on the knob 23a to the gear segments 32 will operate in harmony.

Upon the shaft 28, Figs. 15 and 16, close to bracket 4 is mounted a crown tooth wheel 28c having ten teeth, like the pinion 28b, and as both are fast to the same shaft 28 their relative positions tooth for tooth, will remain unchanged. An arm 31 is secured to the shaft 6 and in the course of its revolution the end of said arm will pass between two teeth of the crown wheel 28c. This arm is designed to enter the space between such teeth immediately before the gear segment 32 has ceased to operate on the pinion 28b, (which will be very close to the end of a revolution) and to remain in such space during the time the machine is idle. The arm 31 serves a double purpose, first to prevent the shaft 28 from racing past the point to which it is driven by the gears, and second to give the shaft a slight retrograde motion in order to provide more clearance between the entering tooth of the gear segment 32 and the tooth of the pinion 28b. The tooth profiles of both gears 32 and 28b are of special design owing to the requirement that a tooth of the gear 32 must enter and complete its contact with pinion 28b wihout advancing the latter more than one tooth interval. To meet this requirement very little clearance space is left between the point of the entering tooth and the point of the pinion tooth it has to avoid. For this reason the arm 31 is caused to back up the pinion slightly, as described, thus increasing the clearance, (see Fig. 15). This reverse motion has no ill effects on the counting mechanism, doing little more than take the back lash out of the gears. The point 31a of the arm 31 is beveled (see Fig. 16) where it enters the tooth space in wheel 28c which permits the wheel to complete its movement after the arm has entered.

While the arm 31 will prevent the wheel from over-riding its resting point—a brake is also applied to the rim of wheel 28c in the form of a spring pressed plug 30, Fig. 3, mounted in a hole in bracket 4. Very little pressure is exerted on this brake plug and it is only introduced to prevent the wheel from being accidentally jarred out of position during the interval when it is not under control, namely between the time when the arm 31 leaves contact with the wheel 28c and the first tooth of the gear 32 engages the pinion 28b.

The gears 32 are all positioned on the carrier 32a so that the last tooth of each will be in line, and the engagement of each with pinion 28b will always terminate at the same time in the revolution of the carrier, no matter how many teeth there may be in the segment, the registering being completed near the end of the operation.

Fraud prevention

Figure 5A:
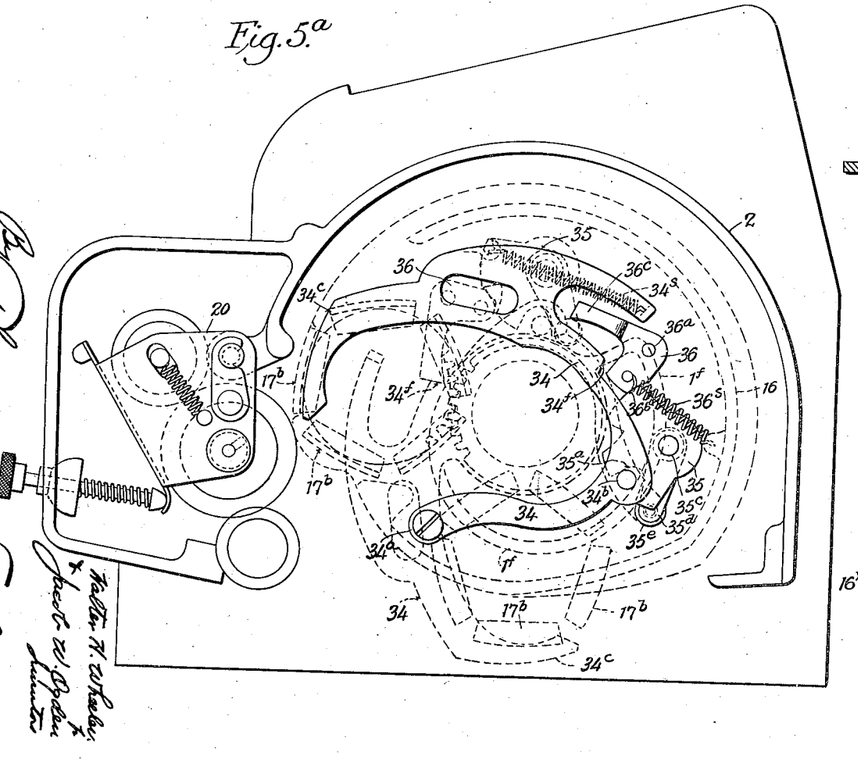
Figure 6:
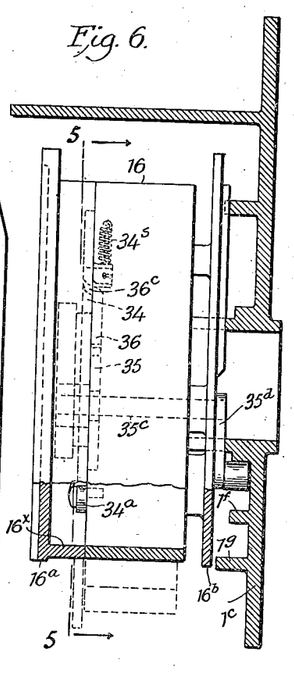
Fig. 6 is a side view of Fig. 5 partly in section.
Figure 7:
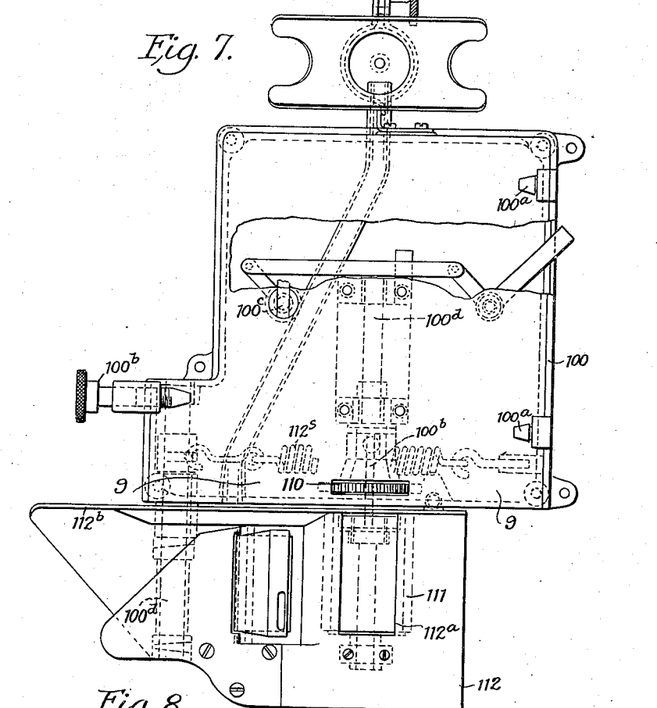
Fig. 7 is a plan view of the base member of the machine and parts therein.

The uncoupling of the two units A and B, can only be done when the printing drum is in its normal position and the stamping dies are in an inaccessible part of the drum housing. The act of uncoupling locks the drum in this position so that there is no fear of their being tampered with when the upper unit is separated from the case. To prevent fraudulent imprints from being made while A and B are assembled, means are provided whereby any attempt to obtain a fraudulent impression will be frustrated. In the construction shown an approximately U-shaped lever 34 (Figs. 5 and 6) has one end pivoted at 34a to the outer side of the drum 16 and its free end 34c is normally below the printing surface as illustrated in full lines in Fig. 5a. The lever has an inwardly projecting pin 34b which engages a notch 35a in a cam 35. A spring 34s attached to lever 34 and a part of the drum 16 tends to pull the lever away from its normal position and rock it so that its outer end will project beyond the surface of the stamp die 17b but the cam 35 acting on the pin 34b of the lever, prevents it from so doing. The cam 35 is secured to a spindle 35c, the spindle passes through the drum 16 and the rear disk 16b and has on its rear end an arm 35d provided with an anti-friction roller 35e which contacts with a cam 1f on the wall 1c of the casing; said cam 1f and roller 35e controls the movement of the cam 35.

A pawl 36 is pivoted on the drum at 36a beside cam 35. The heel 36b of pawl 31 normally engages the cam 35 and is held in contact therewith by a spring 36s (see Fig. 5a). When cam 35 is turned to the position shown in dotted lines in Fig. 5a and in full lines in Fig. 5 the heel 36b will enter a notch 35b in cam 35 and allow the arm 36c of pawl 36 to engage a shoulder 34f of lever 34 as shown in full lines in Fig. 5.

The action of the lever and the cams is as follows. Starting from the normal position of the parts as illustrated in full lines in Fig. 5a the roller 35e of the arm 35d resting on the high part of the cam 1f causes the slot 35a of cam 35 to hold the pin 34b in position to prevent lever 34 being moved by spring 34s. The parts are held in such relative positions until the dies 17b are well past the inker and near the printing point. The roller 35e then reaches the low portion of cam 1f and permits spring 34s to move the lever 34 to the dotted line position Fig. 5a as pin 34b causes cam 35 to turn and allow the pawl end 36c to engage the shoulder 34f of lever 34. The free end 34c of lever 34 then projects below the printing surface of the lowermost die 17b see Fig. 5 and an envelope could not then be pressed against said die because of the obstruction presented by head 34c of the lever; and the lever 34 cannot be pushed back because the pawl 36 is engaged with shoulder 34f as shown in dotted lines in Fig. 5. Pawl 36 can only be disengaged by moving the cam 35 back, and cam 35 can only be moved back when permitted by the cam 1f, all of which parts are inaccessible. The parts remain in the position shown in full lines in Fig. 5 until the drum has moved the die past the bottom opening in the drum housing, and the die is again under cover. Then the cam 1f gradually rises and permits the cam 35 to turn and cam 35 first disengages pawl 36 from lever 34, by rocking the heel 36b of the pawl out of notch 35b; and then the side of the notch 35a engages pin 34b and forces it to move the lever 34 back to the relative positions indicated in full lines in Fig. 5a in which position they remain during the balance of the revolution of the drum 16.

The guard lever 34 will not be advanced beyond the surface of the stamp die as just described if the frame 112 Fig. 11 and the roller 111 Fig. 11 are in their normal position to press against the die or if a letter is in place between die and roller, because the guard 34 (Figs. 5 and 6) is only moved downward by the action of spring 34s and not by positive means, and the spring will be overcome if the end 34c of the lever contacts with an envelope or with the frame 112; but if said frame is pressed downward allowing the lever to drop the lever cannot be pushed back again until pawl 36 is disengaged therefrom as above described. A fraudulent imprint cannot be obtained by means of the impression roller because it would be necessary to pass the die across the roller, moving it too far to get a second print, and as the drum cannot be turned backward, the revolution of the drum would have to be completed which would register the stamp in the meter, frustrating the fraud if a fraud was intended. A fraudulent impression would have to be made without advancing the die, so that the hand or some means other than the regular impression roller must be used in attempting to get a fraudulent impression and in order to do this the frame 112 must be depressed and this will allow the guard to drop and prevent the fraud.

The machine is provided with means for locking the meter when the amount of stamps paid for has been exhausted such as used in prior machines and described in prior patents and therefore illustration and description of such locking means is unnecessary. The sealer may be of any suitable construction and is disclosed in other patents and further description and illustration thereof is unnecessary.

It will be seen that the inventor provides novel means for stopping the envelope while it is being passed between a continuously revolving printing drum and impression roller—novel means for selecting and locking the stamping dies in the proper printing position, and preserving the relation between each of the dies, and its selective gear connection with the counting mechanism of the postage meter—novel means for stopping the counting mechanism at the proper instant insuring an exact count—and novel means to prevent fraudulent impressions from being made from the printing dies. Also that for feeding the letters we have combined the holding fingers with a driven impression roller.

Further in our invention the stamp selecting devices are directly in front of the operator and the pointer on the selector knob and the figures on the dial plate are in plain sight. The selector being in alignment with the drum shaft instead of the turret enables sturdier pins to be used to lock the dies in position.

Further in the prior machine the gear segments came into action at the beginning of the rotation of the die, and as the number of teeth in any one segment is different from each of the other segments, the termination of the gear drive differed according to the segment in engagement therewith; and as the engagement of the alignment arm of necessity took place at the end of the operation there was danger of the shaft, driving the counter, racing ahead during the period intervening between the time the gears went out of mesh and the time the arm engaged the crown wheel and to prevent this a heavy brake was applied to the crown wheel. In the present invention all of the gear segments finish their work at the end, instead of the beginning, of their rotation, and the alignment arm comes immediately into action and positively prevents any tendency to race, and the brake pressure is reduced to almost nothing, as its function is merely to prevent vibration or jar from accidently moving the shaft, instead of, as formerly, to nullify the inertia set up by the action of the gears.

We claim:
1. In a machine of the character set forth having envelope feeding means and means including a positively driven impression roller for imprinting the envelope as it passes through the machine, of envelope arresting means comprising movable fingers, a spring for normally holding these fingers in uplifted position, a lever for actuating the fingers to depress same, a pair of cams for actuating said lever, and means for operatively engaging the lever with either cam according to whether the envelope is or is not to be stopped after an impression is made thereon.

2. In a mechanism of the character described, a rotatable drum carrying a printing die, and a protector carried by the drum to prevent obtaining a fraudulent impression from the die said protector being held inoperative by the presence of an envelope, but projecting into operative position if such envelope is removed, and means to prevent retraction of the protector once projected until the drum is again rotated.

3. In a mechanism of the character described, a rotatable drum carrying a printing die, and means adjacent the printing die adapted to automatically prevent obtaining an impression from the die if the impression roller is not in normal position for printing.

4. In mechanism of the character specified having a rotating drum carrying a printing die; a lever pivotally mounted on the drum and having its free end adjacent the die, a spring for holding the lever in retracted position, and means whereby during each rotation of the drum the lever is locked in projected position immediately after the matter has been normally printed upon, or immediately upon exposure of the die if the impression roller has been withdrawn.

5. In mechanism of the character specified having a rotating drum carrying a printing die; a lever pivotally mounted on the drum and having its free end lying adjacent the die but normally retracted below the surface thereof, a spring for holding the lever in retracted position, a pawl for locking said lever in projected position, a cam plate for normally holding the pawl disengaged, and means including a fixed cam for rocking the cam plate at each rotation of the drum to release the pawl and permit it to lock the lever in projected position when the die is exposed at printing position if the impression roller is not in normal position for printing, or when the impression roller is in normal position immediately after an impression has been made.

6. In a machine of the character specified having a rotatable drum carrying one or more printing dies, and a positively driven impression roller cooperating with the die and adapted to cooperate with the drum in feeding envelopes through the machine; a plate between the drum and impression roller having an opening over the impression roller, the upper surface of said impression roller being slightly below the upper surface of the said plate; and means for pressing the envelope against the upper face of the said plate to arrest the envelope and permit the roller to rotate without advancing the envelope after the die has made an impression thereon; and means for thereafter releasing the envelope and permitting it to advance and receive a subsequent impression immediately adjacent the preceding impression.

7. In mechanism of the character set forth in claim 6, said arresting means comprising movable fingers, a spring for normally holding these fingers in uplifted position, and means for depressing the fingers.

8. In mechanism as set forth in claim 6 said arresting means comprising movable fingers at opposite sides of the slot in the plate, means for normally holding these fingers in uplifted position and means for depressing them, the inside finger being slightly higher than the outside finger, so that the envelope is not pinched between the inside finger and the impression roller.

9. In a machine of the character specified having a plurality of rotatably mounted dies; means for changing the die face exposed, said means comprising a die shifting member having a plurality of holes, a series of plungers adapted to engage said holes to lock said member, and a die shifting member adapted to disengage the plungers from the die controlling member when it is desired to change the die, the entering end of one of the said plungers being smaller than the rest to insure engagement even if the die controlling member is slightly out of alignment.

10. In mechanism as set forth in claim 9, a fixed castellated member, and an opposed castellated member connected with the die shifting member adapted to engage the fixed castellated member and position the die shifting member so it will disengage the plungers.

11. In a machine of the character specified having a plurality of rotatably mounted dies, a die controlling member having a plurality of holes, a series of plungers adapted to engage said holes and lock said member, and a die shifting member having studs adapted to disengage the plungers from the die controlling member when it is desired to change the die; and means adapted to hold the die shifting member when adjusted in position to ensure that the stud will enter said holes.

12. In a machine of the character specified having a plurality of rotatably mounted dies, means for changing the die face exposed, said means including a pinion for shifting the dies having a plurality of holes, a series of plungers adapted to engage said holes, and lock said pinion, and a die shifting member having studs adapted to disengage the plungers from the said pinion, a castellated member attached to the die shifting member and adapted to engage a relatively fixed castellated member to hold the die shifting member in any adjusted position and insure that the studs will enter the holes in the pinion.

13. In a machine of the character specified having a plurality of rotatably mounted dies; means for changing the die face exposed, said means comprising a die controlling member having a plurality of holes, a series of plungers adapted to engage said holes and lock said member, and a die shifting member adapted to disengage the plungers from the die controlling member when it is desired to change the die; one of said plungers having a stem adapted to prevent disengagement with the die controlling member unless the parts are in proper position for shifting.

14. In mechanism as set forth in claim 2; said means including a lever mounted on the drum adjacent to the printing die adapted to be held in ineffective position by an envelope being normally printed upon, and means operative immediately after a normal impression has been made, to automatically shift said lever into position to prevent taking a fraudulent impression.

15. In a mechanism as set forth in claim 9, one or more of said plungers when disengaged from the die controlling member entering an aperture, or apertures, so located in the fixed structure of the machine that said plunger or plungers can only enter when the printing drum is in the normal rest position, whereby the printing drum can only be revolved again after the plunger or plungers reenter and engage the die controlling member.

16. In a machine of the character specified having a plurality of rotatably mounted dies and a registering mechanism operated in accordance with the die face exposed for printing; means for changing the die face exposed, said means comprising a die shifting member having a plurality of holes, a series of plungers adapted to engage said holes to lock said member, and a die shifting member adapted to disengage the plungers from the die controlling member when it is desired to change the die; the entering end of one of the said plungers being smaller than the rest to insure engagement even if the die controlling member is slightly out of alignment.

17. In mechanism as set forth in claim 16, a fixed castellated member, and an opposed castellated member connected with the die shifting member adapted to engage the fixed castellated member and position the die shifting member so it will disengage the plungers.

18. In a machine of the character specified having a plurality of rotatably mounted dies and a registering mechanism operated in accordance with the die face exposed for printing; a die controlling member having a plurality of holes, a series of plungers adapted to engage said holes and lock said member, a die shifting member having studs adapted to disengage the plungers from the die controlling member when it is desired to change the die, and means adapted to hold the die shifting member when adjusted in position to ensure that the stud will enter said holes.

19. In a machine of the character specified having a plurality of rotatably mounted dies and a registering mechanism operated in accordance with the die face exposed for printing; means for changing the die face exposed, said means including a pinion for shifting the dies having a plurality of holes, a series of plungers adapted to engage said holes and lock said pinion, and a die shifting member having studs adapted to disengage the plungers from the said pinion; and a castellated member attached to the die shifting member and adapted to engage a relatively fixed castellated member to hold the die shifting member in any adjusted position and insure that the studs will enter the holes in the pinion.

20. In a machine of the character specified having a plurality of rotatably mounted dies and a registering mechanism operated in accordance with the die face exposed for printing; means for changing the die face exposed, said means comprising a die controlling member having a plurality of holes, a series of plungers adapted to engage said holes and lock said member, and a die shifting member adapted to disengage the plungers from the die controlling member when it is desired to change the die; one of said plungers having a stem adapted to prevent disengagement with the die controlling member unless the parts are in proper position for shifting.

21. In a mechanism as set forth in claim 16, one or more of said plungers when disengaged from the die controlling member entering an aperture, or apertures, so located in the fixed structure of the machine that said plunger or plungers can only enter when the printing drum is in the normal rest position; whereby the printing drum can only be revolved again after the plunger or plungers reenter and engage the die controlling member.

22. In a machine of the character specified having a printing die and an impression roller cooperating with the die; means for positively rotating said roller, and means operating independently of the roller adapted to stop the advance of an envelope immediately after one impression has been made thereon, and then permit advancing the envelope to receive another impression immediately adjacent the preceding impression.

23. In a printing mechanism having a rotatable die, an impression roller, means for continuously rotating the impression roller, and means coacting with the roller to feed an envelope past the printing point; means operating independently of the roller for stopping the envelope immediately after an impression has been made thereon, and means for thereafter permitting the envelope to advance and receive another impression immediately adjacent the preceding impression.

24. In a machine of the character specified having a rotatable drum carrying one or more printing dies, and a positively driven impression roller cooperating with the die and adapted to cooperate with the drum in feeding envelopes through the machine; means adapted to press the envelope against the stationary surface over which it moves but not in contact with the impression roller, to arrest the envelope after a die has made an impression thereon, and means for thereafter permitting the envelope to advance and receive a subsequent impression immediately adjacent the preceding impression.

25. In mechanism of the character set forth in claim 24, said arresting means comprising movable fingers, a spring for normally holding these fingers in uplifted position, a lever for depressing the fingers, and means for actuating said lever.

26. In a machine of the character specified having a stamp printing die and a postmarking die, a positively driven impression roller cooperating with said dies to feed an envelope through the machine; means adapted after the stamp printing die has made an impression on the envelope to arrest the envelope by pressing it against the stationary surface over which it moves but not into contact with the impression roller, and means for thereafter permitting the envelope to advance and receive a subsequent stamp impression adjacent the preceding stamp impression.

27. In combination with mechanism as set forth in claim 26, means preventing the postmark die from printing upon the envelope until after the last stamp impression has been made thereon.

28. In a machine of the character specified having a rotatable drum carrying a stamp printing die and a postmarking die, an impression roller cooperating with the dies, means to positively rotate said impression roller, and means adapted after the stamp die has made an impression on the envelope to depress the impression roller and press the envelope against the stationary surface over which it moves, thereby arresting the envelope, and means for thereafter permitting the envelope to advance and receive a subsequent stamp impression immediately adjacent the preceding impression.

29. In combination with mechanism as set forth in claim 28, means preventing the postmark die from printing upon the envelope until after the last stamp impression has been made upon the envelope.

30. In a machine of the character specified having a rotatable drum carrying a plurality of selective printing dies and a postmarking die, and a positively driven impression roller cooperating with the die and adapted to cooperate with the drum in feeding envelopes through the machine; means adapted to simultaneously depress the impression roller and press the envelope against the stationary surface over which it moves, whereby the envelope is arrested after a stamp die has made an impression thereon, and means for thereafter permitting the envelope to advance and receive a second subsequent stamp impression immediately adjacent the preceding impression.

31. In combination with mechanism as set forth in claim 30, means preventing the postmark die from printing upon the envelope until after the last stamp impression has been made thereon.

32. In mechanism of the character described, a rotatable drum carrying a printing die, and means carried by the drum to prevent obtaining a fraudulent impression from the die; said means including a lever mounted on the drum adjacent the printing die adapted to be held in ineffective position by the envelope to be printed upon, and means to automatically shift said lever into position to prevent taking of a fraudulent impression.

33. In a mechanism of the character specified containing a continuously rotated impression roller and means cooperating with said roller to make impressions; common means for arresting the passage of matter and depressing the impression roller to enable repeated impressions to be made side by side on the same piece of matter.

34. In a machine of the character specified having a rotatable drum carrying a printing die, a positively driven impression roller cooperating with the die to feed envelopes through the machine; fingers, a spring for normally holding the fingers in uplifted position, a lever for depressing the fingers, a pair of cams rotatable with the drum for actuating said lever, and means for operatively engaging the lever with either of said cams according to whether the envelope is or is not to be stopped after an impression is made thereon.

WALTER H. WHEELER, Jr.
JACOB W. OGDEN.